(12) United States Patent
Mallikarjunaiah et al.

(10) Patent No.: US 11,153,812 B1
(45) Date of Patent: Oct. 19, 2021

(54) PROVISIONING SITE SPECIFIC POLICIES IN WIRELESS LAN DEPLOYMENTS

(71) Applicant: Cisco Technology, Inc., San Jose, CA (US)

(72) Inventors: Niranjan Mallapura Mallikarjunaiah, Karnataka (IN); Vijay Kumar Kothamasu, Karnataka (IN); Ramachandra Murthy S, Bangalore (IN); Ather Sayeed Kanak, Fremont, CA (US); Sheshadri Dwarakanath, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/906,042

(22) Filed: Jun. 19, 2020

(51) Int. Cl.
*H04W 48/16* (2009.01)
*H04B 17/318* (2015.01)
*H04W 84/12* (2009.01)

(52) U.S. Cl.
CPC .......... *H04W 48/16* (2013.01); *H04B 17/318* (2015.01); *H04W 84/12* (2013.01)

(58) Field of Classification Search
CPC ..... H04W 48/16; H04W 84/12; H04B 17/318
See application file for complete search history.

(56) References Cited

U.S. PATENT DOCUMENTS

| | | | |
|---|---|---|---|
| 9,014,155 B2 | 4/2015 | Gupta et al. | |
| 9,622,089 B1* | 4/2017 | Ngo | H04K 3/226 |
| 10,063,417 B2* | 8/2018 | Poola | H04W 12/069 |
| 10,374,814 B2 | 8/2019 | Mishra et al. | |
| 2009/0129291 A1* | 5/2009 | Gupta | H04W 8/26 370/254 |
| 2009/0221287 A1* | 9/2009 | Balasubramanian | H04W 84/045 455/434 |
| 2012/0320768 A1* | 12/2012 | Shaffer | H04W 40/16 370/252 |
| 2012/0320790 A1* | 12/2012 | Shaffer | H04W 40/28 370/254 |
| 2014/0133355 A1* | 5/2014 | Shu | H04W 48/16 370/254 |
| 2015/0117430 A1* | 4/2015 | Zhuang | H04L 67/16 370/338 |
| 2019/0124542 A1* | 4/2019 | Pandey | H04W 28/0252 |
| 2019/0297546 A1* | 9/2019 | Likar | H04W 36/00835 |

FOREIGN PATENT DOCUMENTS

WO 2019058094 A1 3/2019

\* cited by examiner

*Primary Examiner* — Kenneth T Lam
(74) *Attorney, Agent, or Firm* — Merchant & Gould P.C.

(57) ABSTRACT

Provisioning site specific policies in wireless Local Area Networks (LANs) deployments may be provided. First, a master computing device may receive a discovery request and data associated with neighbor access devices learned by a first access device. Then a Radio Frequency (RF) continuity space may be determined based on the received data associated with the neighbor access devices learned by the first access device. Next, a site tag associated with the determined RF continuity space may be determined. Then the site tag associated with the determined RF continuity space may be assigned to the first access device. For the first access device, a worker computing device having the site tag may be selected.

20 Claims, 5 Drawing Sheets

PROVISIONING SITE SPECIFIC POLICIES IN WIRELESS LAN DEPLOYMENTS

TECHNICAL FIELD

The present disclosure relates generally provisioning policies.

BACKGROUND

In computer networking, a wireless Access Point (AP) is a networking hardware device that allows a wireless compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where wireless access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Provisioning site specific policies in wireless Local Area Networks (LANs) deployments may be provided. First, a master computing device may receive a discovery request and data associated with neighbor access devices learned by a first access device. Then a Radio Frequency (RF) continuity space may be determined based on the received data associated with the neighbor access devices learned by the first access device. Next, a site tag associated with the determined RF continuity space may be determined. Then the site tag associated with the determined RF continuity space may be assigned to the first access device. For the first access device, a worker computing device having the site tag may be selected.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Site specific policies may be provisioned on a Wireless Local Area Network (WLC) controller for an Access Point (AP) to join a network. With conventional systems, this may require manual provisioning of the site specific policies on the WLC in order for the AP to join. With the growth of Wi-Fi network deployments and cloud based controllers, identifying a WLC of a given site and manually provisioning of its policies to an AP may be cumbersome, error prone, and may not scale well. Accordingly, there may be a need to automatically detect a site of an AP and a corresponding WLC to provision without manual intervention. This scenario may become more prominent and essential in clustering environments where multiple WLCs are used in providing Wi-Fi services spanned across many sites that may be managed as a single entity.

Consistent with embodiments of the disclosure, AP policies may be automatically provisioned based on a site the AP is in. For a given site, policies may be defined and mapped to a site tag on a WLC. The AP may learn its Radio Resource Management (RRM) neighbors (e.g., other APs) prior to the join process and may shares the learned information with the WLC as part of the discovery process. The WLC may perform a process on the learned information associated with the RRM neighbors reported by the AP to find a Radio Frequency (RF) continuity space and fetch a site tag used by the RRM neighbors. The WLC may then use this fetched site tag to automatically provision the AP with the correct policies. Accordingly, APs deployed in a given site may be provisioned with policies associated with a same site tag uniformly and also join the same WLC especially in clustering environments. Since all of the APs may be joined to a same WLC, Layer 3 (L3) roams may be avoided, RRM communication may be kept local so as to optimize and enhance mobility and RRM functions.

APs in the same RF continuity space may be validated using neighbor information available in Neighbor Discovery Packets (NDPs) that may be broadcasted periodically by the APs. In other words, the RF continuity space for a given AP may be deduced from NDP messages (i.e., RRM neighbor information) exchanged between APs in the site.

In the case of clustering architecture, WLCs may be located remotely while the APs are deployed in the premises. During an AP join process, embodiments of the disclosure may ensure APs of a given site join a common WLC and may be assigned with a site specific tag and policy. With the cluster being large and distributed, no single administrator may have an idea of all the locations to configure them manually. Accordingly, embodiments of the disclosure may provide an automatic way of designating APs to a common WLC and assigning site specific policies. In other words, embodiments of the disclosure may automatically on-board an AP to a proper WLC and with proper policies.

Figure 1:
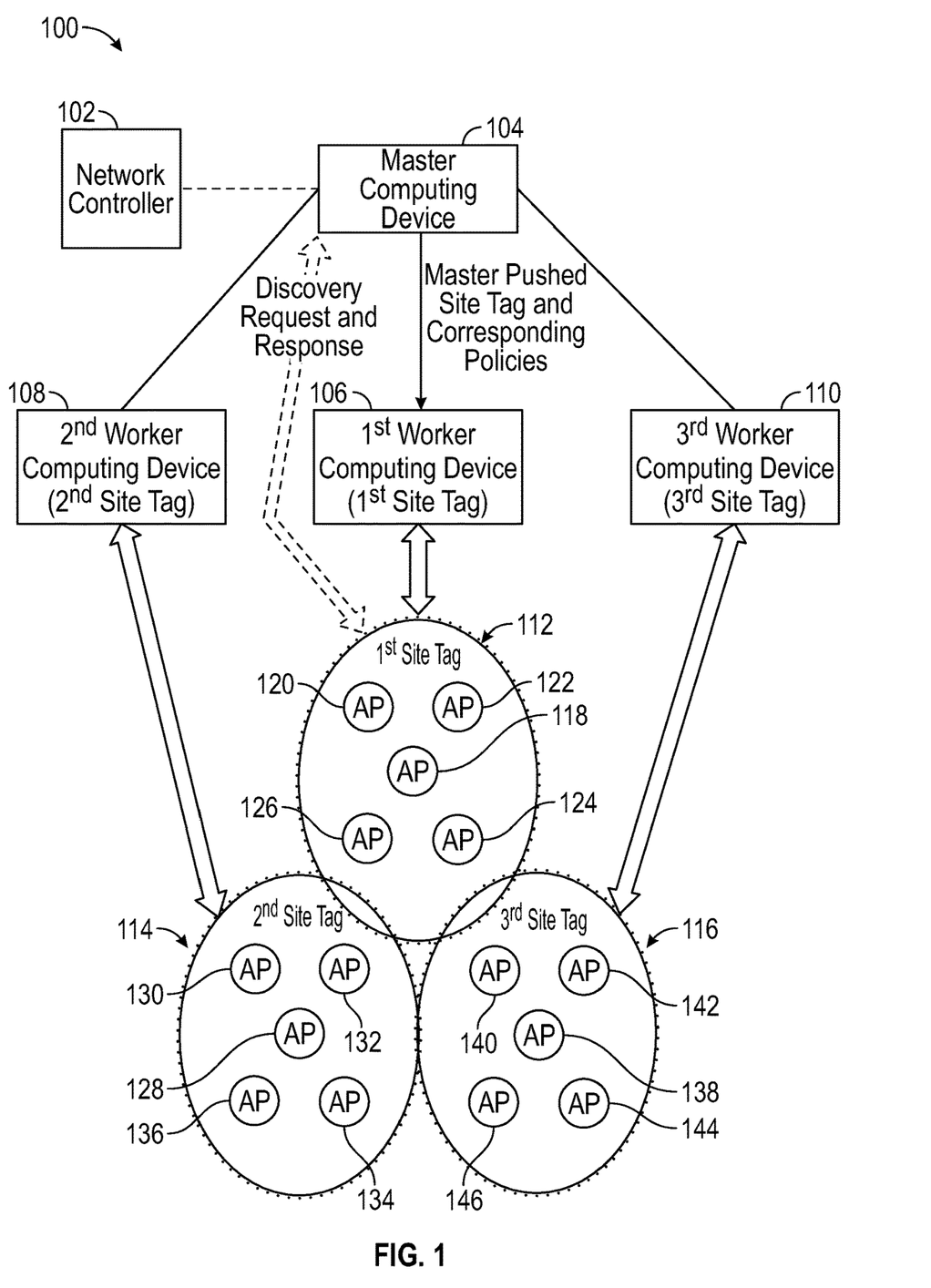
FIG. 1 is a block diagram of an operating environment.

FIG. 1 shows an operating environment 100. As shown in FIG. 1, operating environment 100 may comprise a network controller 102, a master computing device 104, a first worker computing device 106, a second worker computing device 108, and a third worker computing device 110. Operating environment 100 may further include a first RF continuity space 112, a second RF continuity space 114, and a third RF continuity space 116. First RF continuity space 112 may comprise a first site having a first site tag. Second RF continuity space 114 may comprise a second site having a second site tag. Similarly, third RF continuity space 116 may comprise a third site having a third site tag.

A first plurality of access devices (e.g., a first AP 118, a second AP 120, a third AP 122, a fourth AP 124, and a fifth AP 126) may be included in first RF continuity space 112. A second plurality of access devices (e.g., a sixth AP 128, a seventh AP 130, an eighth AP 132, a ninth AP 134, and a tenth AP 136) may be included in second RF continuity space 114. Similarly, a third plurality of access devices (e.g., an eleventh AP 138, a twelfth AP 140, a thirteenth AP 142, a fourteenth AP 144, and a fifteenth AP 146) may be included in third RF continuity space 116.

Consistent with embodiments of the disclosure, network controller 102 may provision a master WLC (e.g., master computing device 104) and push global and site tag specific configurations to the master WLC. Operating environment 100 may have any number of WLCs and APs. WLCs may form a cluster with one WLC as a cluster master WLC and the others as worker WLCs.

As shown in FIG. 1, in some embodiments of the disclosure, the plurality of access devices in the RF continuity spaces may comprise Wi-Fi APs configured to support a wireless (e.g., Wi-Fi) hotspot. These Wi-Fi APs may include Institute of Electrical and Electronic Engineers (IEEE) 802.11 compliant radios. The Wi-Fi hotspot may comprise a physical location where a user, operating a user device, may obtain access to a network (e.g., Internet access), using Wi-Fi technology, via a WLAN using a router connected to a service provider.

In other embodiments of the disclosure, the plurality of access devices in the RF continuity spaces may comprise devices that may be connected to a cellular network that may communicate directly and wirelessly with end use devices (e.g., user devices operated by users) to provide access to the network (e.g., Internet access). For example, the plurality of access devices in the RF continuity spaces may comprise, but are not limited to, eNodeBs (eNB) or gNodeBs (gNB). The aforementioned cellular network may comprise, but is not limited to, a Long-Term Evolution (LTE) broadband cellular network, a Fourth Generation (4G) broadband cellular network, or a Fifth Generation (5G) broadband cellular network, operated by a service provider.

Any of the aforementioned user devices may comprise, but are not limited to, a smartphone, a tablet device, a personal computer, a mobile device, a cellular base station, a telephone, a remote control device, a set-top box, a digital video recorder, a cable modem, a network computer, a mainframe, a router, or other similar microcomputer-based device capable of accessing and using a Wi-Fi network or a cellular network.

Consistent with embodiments of the disclosure, network controller 102 may comprise a network management and command center that may provision and configure network devices (e.g., WLCs and access devices (e.g., APs)). Master computing device 104, first worker computing device 106, second worker computing device 108, and third worker computing device 110 may comprise WLCs. First worker computing device 106 may comprise a WLC that controls the first plurality of access devices in first RF continuity space 112. Second worker computing device 108 may comprise a WLC that controls the second plurality of access devices in second RF continuity space 114. Similarly, third worker computing device 110 may comprise a WLC that controls the third plurality of access devices in third RF continuity space 116.

Network controller 102 may use Artificial Intelligence (AI) and Machine Learning (ML) to proactively monitor, troubleshoot, and optimize the network. It may also integrate with third-party systems for improved operational processes. For example, network controller 102 may comprise, but is not limited to, a Digital Network Architecture Controller (DNA-C).

The elements described above of operating environment 100 (e.g., network controller 102, master computing device 104, first worker computing device 106, second worker computing device 108, third worker computing device 110, each of the first plurality of access devices, each of the second plurality of access devices, and each of the third plurality of access devices) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
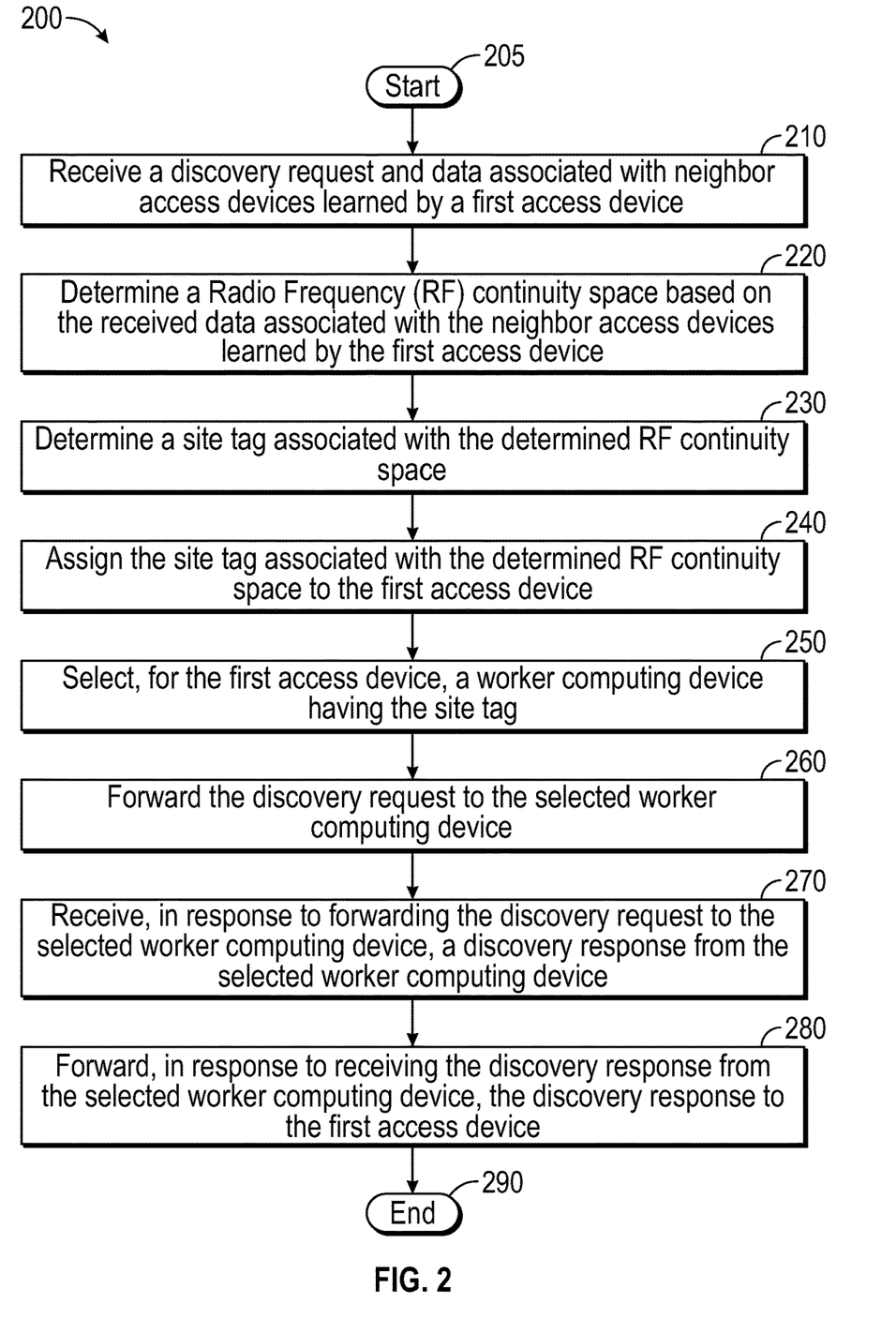
FIG. 2 is a flow chart of a method for provisioning site specific policies in wireless Local Area Network (LAN) deployments.

FIG. 2 is a flow chart setting forth the general stages involved in a method 200 consistent with an embodiment of the disclosure for provisioning site specific policies in wireless LAN deployments. Method 200 may be implemented using master computing device 104 (e.g., a master WLC) as described in more detail above with respect to FIG. 1. Ways to implement the stages of method 200 will be described in greater detail below.

Method 200 may begin at starting block 205 and proceed to stage 210 where master computing device 104 may receive a discovery request and data associated with neighbor access devices learned by a first access device (e.g., first AP 118). For example, master computing device 104, first worker computing device 106, second worker computing device 108, and third worker computing device 110 may form a cluster. Network controller 102 may provision master computing device 104 as a master WLC (i.e., leader of the cluster formed of master computing device 104, first worker computing device 106, second worker computing device 108, and third worker computing device 110) (stage 302 of FIG. 3).

Figure 3:
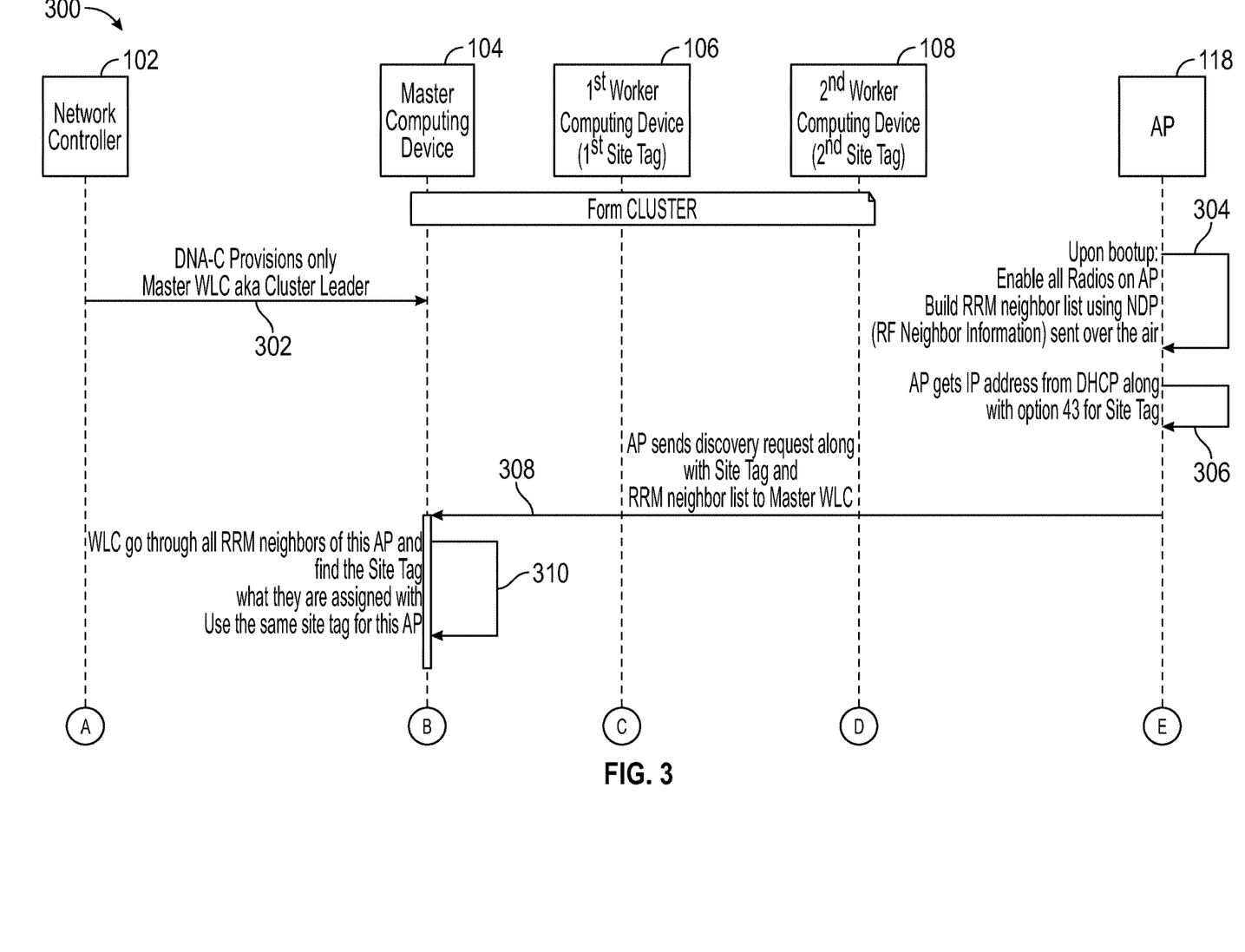
FIG. 3 is a sequence diagram of a method for provisioning site specific policies in wireless LAN deployments.

Upon boot up, first AP 118 may turn on all of its radios and may learn its RRM neighbors using NDP (stage 304 of FIG. 3). First AP 118 may build a list of its learned RRM neighbors (e.g., second AP 120, third AP 122, fourth AP 124, and a fifth AP 126). In addition, first AP 118 may measure the Received Signal Strength Indicator (RSSI) values associated with its learned RRM neighbors. The APs of operating environment 100 may be primed with a domain name or Internet Protocol (IP) address of master computing device 104 (i.e., the master WLC) using, for example, option 43 of NDP (stage 306 of FIG. 3). First AP 118 may obtain the IP address of master computing device 104 from a Dynamic Host Configuration Protocol (DHCP) server. As part of discovery, first AP 118 may send a discovery request and data associated with neighbor access devices learned by first AP 118 to master computing device 104 (stage 308 of FIG. 3). For example, the data sent by first AP 118 with the discovery request may include the list of its learned RRM neighbors (e.g., second AP 120, third AP 122, fourth AP 124, and a fifth AP 126) and each of their respective RSSIs at first AP 118.

From stage 210, where master computing device 104 receives the discovery request and data associated with neighbor access devices learned by the first access device, method 200 may advance to stage 220 where master computing device 104 may determine an RF continuity space (e.g., first RF continuity space 112) based on the received data associated with the neighbor access devices learned by the first access device (e.g., first AP 118). For example, master computing device 104 may run a process on the RRM neighbors of first AP 118 listed in the data received from first AP 118 to find the RF continuity space.

The RF continuity space may be deduced using, for example, a k-means process on the RRM neighbors of first AP 118 listed in the data received from first AP 118, with a configured minimum RSSI threshold that may be used for grouping RRM neighbors in the RF continuity space. For example, first AP 118 may see second AP 120, third AP 122, fourth AP 124, and fifth AP 126 at RSSI levels equal to or stronger than the configured minimum RSSI threshold and eighth AP 132 and twelfth AP 140 at RSSI levels less than the configured minimum RSSI threshold. Accordingly, master computing device 104 may group first AP 118 with the RF continuity space (i.e., first RF continuity space 112) of second AP 120, third AP 122, fourth AP 124, and a fifth AP 126, and not with the RF continuity space of eighth AP 132 or twelfth AP 140.

Once master computing device 104 determines the RF continuity space based on the received data associated with the neighbor access devices learned by the first access device in stage 220, method 200 may continue to stage 230 where master computing device 104 may determine a site tag associated with the determined RF continuity space. For example, master computing device 104 may fetch from a database the site tag used by second AP 120, third AP 122, fourth AP 124, and fifth AP 126 (i.e., used by first RF continuity space 112). In this example, the site tag for first RF continuity space 112 may comprise "first site tag" (stage 310 of FIG. 3).

After master computing device 104 determines the site tag associated with the determined RF continuity space in stage 230, method 200 may proceed to stage 240 where master computing device 104 may assign the site tag associated with the determined RF continuity space to the first access device. For example, master computing device 104 may assign the site tag "first site tag" associated with first RF continuity space 112 to first AP 118.

After master computing device 104 assigns the site tag associated with the determined RF continuity space to the first access device in stage 240, method 200 may proceed to stage 250 where master computing device 104 may select, for the first access device, a worker computing device (e.g., first worker computing device 106) having the site tag. For example, because first AP 118 and first worker computing device 106 both have the same site tag (i.e., "first site tag"), master computing device 104 may select first worker computing device 106 to control first AP 118 (stage 312 of FIG. 3).

In another embodiment, if no RRM neighbors were found by first AP 118, master computing device 104 may select a worker computing device based on a site tag provided by first AP 118 in the discovery request (stage 314 of FIG. 3). In yet another embodiment, if a worker computing device having the fetched site tag cannot be found, then master computing device 104 may select a new worker computing device and push the site tag along with policies to the new worker computing device.

From stage 250, where master computing device 104 selects, for the first access device, the worker computing device having the site tag, method 200 may advance to stage 260 where master computing device 104 may forward the discovery request to the selected worker computing device. For example, master computing device 104 may forward the discovery request received above from first AP 118 to first worker computing device 106 (stage 316 of FIG. 3).

Once master computing device 104 forwards the discovery request to the selected worker computing device in stage 260, method 200 may continue to stage 270 where master computing device 104 may receive, in response to forwarding the discovery request to the selected worker computing device, a discovery response from the selected worker computing device. For example, master computing device 104 may receive a discovery response from first worker computing device 106 in response to master computing device 104 forwarding the discovery request received above from first AP 118 to first worker computing device 106 (stage 318 of FIG. 3).

After master computing device 104 receives, in response to forwarding the discovery request to the selected worker computing device, a discovery response from the selected worker computing device in stage 270, method 200 may proceed to stage 280 where master computing device 104 may forward, in response to receiving the discovery response from the selected worker computing device, the discovery response to the first access device. For example, master computing device 104 may forward the discovery response received from first worker computing device 106 to first AP 118 in response to master computing device 104 receiving the discovery response from first worker computing device 106 (stage 320 of FIG. 3). Then first AP 118 may join first worker computing device 106 (stage 322 of FIG. 3). Once master computing device 104 forwards, in response to receiving the discovery response from the selected worker computing device, the discovery response to the first access device in stage 280, method 200 may then end at stage 290.

Consistent with embodiments of the disclosure, an AP may enable its radios and build a neighbor list before the join process and send the neighbor list to a WLC as part of a discovery request. AP may be assigned with a site tag based on an RF continuity space that may be deduced from its RF neighbor information. Dynamic selection of a site specific WLC, based on the availability of site tag specific configurations. Embodiments of the disclosure may include automatic on-boarding of APs to site specific WLC with the help of neighbor information to apply the policies uniformly and hence optimize the mobility and RRM functions.

Embodiments of the disclosure may be used, for example, in multi-site deployments, WLC clustering environments spanned across multiple locations and sites, and Wi-Fi Cloud offerings. Some example advantages of embodiments of the disclosure may include, but are not limited to: i) simplification of wireless deployment do to less manual intervention; ii) RF neighbor properties may help to provide proper grouping and applying policies; and iii) APs being assigned with correct site tags based on site during initial join process itself. An AP may inherit a site tag, for example, from option-43 during DHCP or through the staging process. If the site tag is available from both Option-43 and RF neighbors, then neighbor site tag may be given preference over inheriting the policies. In a cluster environment, the master WLC may dynamically select the worker WLC for pushing the site tag specific configurations before any of the AP with that site tag can join.

With conventional systems, this may require manual provisioning of the site specific policies on the WLC in order for the AP to join. With the growing Wi-Fi network deployments and cloud based controllers, identifying a WLC of a given site and manually provisioning of its policies to an AP may be cumbersome, error prone, and may not scale well. Embodiments of the disclosure may: i) automatically assign a WLC instance for a particular site; ii) automatically delegate APs to the site specific WLC during the joining process with the help of neighbor information (this may reduce roaming scenarios and also improve RRM functions); and iii) assign site specific tags and policies to APs automatically based on the neighbor information.

Figure 4:
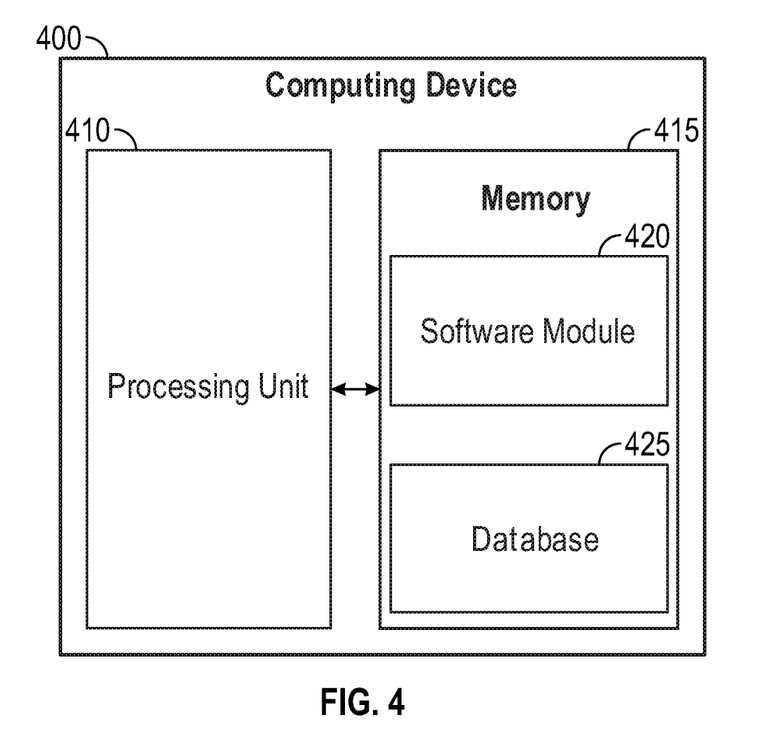
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for provisioning site specific policies in wireless LAN deployments as described above with respect to FIG. 2. Computing device 400, for example, may provide an operating environment for network controller 102, master computing device 104, first worker computing device 106, second worker computing device 108, third worker computing device 110, each of the first plurality of access devices, each of the second plurality of access devices, and each of the third plurality of access devices. Network controller 102, master computing device 104, first worker computing device 106, second worker computing device 108, third worker computing device 110, each of the first plurality of access devices, each of the second plurality of access devices, and each of the third plurality of access devices may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure may comprise a method. The method may comprise: receiving, by a master computing device, a discovery request and data associated with neighbor access devices learned by a first access device; determining a Radio Frequency (RF) continuity space based on the received data associated with the neighbor access devices learned by the first access device; determining a site tag associated with the determined RF continuity space; assigning the site tag associated with the determined RF continuity space to the first access device; and selecting, for the first access device, a worker computing device having the site tag. The data associated with the neighbor access devices may comprise Received Signal Strength Indicator RSSI values associated with the neighbor access devices received at the first access device. Determining the RF continuity space based on the received data associated with the neighbor access devices may comprise using k-means clustering on the data associated with the neighbor access devices. The method may further comprise forwarding the discovery request to the selected worker computing device. The method may further comprise receiving, in response to forwarding the discovery request to the selected worker computing device, a discovery response from the selected worker computing device. The method may further comprise forwarding, in response to receiving the discovery response from the selected worker computing device, the discovery response to the first access device. The first access device may comprise a Wi-Fi Access Point (AP). Each of the neighbor access devices may comprise a respective Wi-Fi AP. The master computing device may comprise a Wireless Local Area Network Controller (WLC). The worker computing device may comprises a WLC.

Embodiments of the disclosure may comprise a system. The system may comprise a memory storage and a processing unit coupled to the memory storage. The processing unit may be operative to: receive a discovery request and data associated with neighbor access devices learned by a first access device; determine a Radio Frequency (RF) continuity space based on the received data associated with the neighbor access devices learned by the first access device; determine a site tag associated with the determined RF continuity space; assign the site tag associated with the determined RF continuity space to the first access device; and select, for the first access device, a worker computing device having the site tag. The data associated with the neighbor access devices may comprise Received Signal Strength Indicator RSSI values associated with the neighbor access devices received at the first access device. The processing unit being operative to determine the RF continuity space based on the received data associated with the neighbor access devices may comprise the processing unit being operative to use k-means clustering on the data associated with the neighbor access devices. The processing unit may be further operative to forward the discovery request to the selected worker computing device. The processing unit may be further operative to receive, in response to forwarding the discovery request to the selected worker computing device, a discovery response from the selected worker computing device. The processing unit may be further operative to forward, in response to receiving the discovery response from the selected worker computing device, the discovery response to the first access device.

Embodiments of the disclosure may comprise a computer-readable medium that stores a set of instructions which when executed perform a method. The method may comprise:

receiving, by a master computing device, a discovery request and data associated with neighbor access devices learned by a first access device; determining a Radio Frequency (RF) continuity space based on the received data associated with the neighbor access devices learned by the first access device; determining a site tag associated with the determined RF continuity space; assigning the site tag associated with the determined RF continuity space to the first access device; and selecting, for the first access device, a worker computing device having the site tag. The data associated with the neighbor access devices may comprise Received Signal Strength Indicator RSSI values associated with the neighbor access devices received at the first access device. Determining the RF continuity space based on the received data associated with the neighbor access devices may comprise using k-means clustering on the data associated with the neighbor access devices. The computer-readable medium further comprises forwarding the discovery request to the selected worker computing device; receiving, in response to forwarding the discovery request to the selected worker computing device, a discovery response from the selected worker computing device; and forwarding, in response to receiving the discovery response from the selected worker computing device, the discovery response to the first access device.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a master computing device, a discovery request and data associated with neighbor access devices learned by a first access device;
   determining a Radio Frequency (RF) continuity space based on the received data associated with the neighbor access devices learned by the first access device;
   determining a site tag associated with the determined RF continuity space;
   assigning the site tag associated with the determined RF continuity space to the first access device; and
   selecting, for the first access device, a worker computing device having the site tag.

2. The method of claim 1, wherein the data associated with the neighbor access devices comprises Received Signal Strength Indicator (RSSI) values associated with the neighbor access devices received at the first access device.

3. The method of claim 1, wherein determining the RF continuity space based on the received data associated with the neighbor access devices comprises using k-means clustering on the data associated with the neighbor access devices.

4. The method of claim 1, further comprising forwarding the discovery request to the selected worker computing device.

5. The method of claim 4, further comprising receiving, in response to forwarding the discovery request to the selected worker computing device, a discovery response from the selected worker computing device.

6. The method of claim 5, further comprising forwarding, in response to receiving the discovery response from the selected worker computing device, the discovery response to the first access device.

7. The method of claim 1, wherein the first access device comprises a Wi-Fi Access Point (AP).

8. The method of claim 1, wherein each of the neighbor access devices comprises a respective Wi-Fi AP.

9. The method of claim 1, wherein the master computing device comprises a Wireless Local Area Network Controller (WLC).

10. The method of claim 1, wherein the worker computing device comprises a WLC.

11. A system comprising:
a memory storage; and
a processing unit coupled to the memory storage, wherein the processing unit is operative to:
receive a discovery request and data associated with neighbor access devices learned by a first access device;
determine a Radio Frequency (RF) continuity space based on the received data associated with the neighbor access devices learned by the first access device;
determine a site tag associated with the determined RF continuity space;
assign the site tag associated with the determined RF continuity space to the first access device; and
select, for the first access device, a worker computing device having the site tag.

12. The system of claim 11, wherein the data associated with the neighbor access devices comprises Received Signal Strength Indicator (RSSI) values associated with the neighbor access devices received at the first access device.

13. The system of claim 11, wherein the processing unit being operative to determine the RF continuity space based on the received data associated with the neighbor access devices comprises the processing unit being operative to use k-means clustering on the data associated with the neighbor access devices.

14. The system of claim 11, wherein the processing unit is further operative to forward the discovery request to the selected worker computing device.

15. The system of claim 14, wherein the processing unit is further operative to receive, in response to forwarding the discovery request to the selected worker computing device, a discovery response from the selected worker computing device.

16. The system of claim 15, wherein the processing unit is further operative to forward, in response to receiving the discovery response from the selected worker computing device, the discovery response to the first access device.

17. A non-transitory computer-readable medium that stores a set of instructions which when executed perform a method comprising:
receiving, by a master computing device, a discovery request and data associated with neighbor access devices learned by a first access device;
determining a Radio Frequency (RF) continuity space based on the received data associated with the neighbor access devices learned by the first access device;
determining a site tag associated with the determined RF continuity space;
assigning the site tag associated with the determined RF continuity space to the first access device; and
selecting, for the first access device, a worker computing device having the site tag.

18. The non-transitory computer-readable medium of claim 17, wherein the data associated with the neighbor access devices comprises Received Signal Strength Indicator (RSSI) values associated with the neighbor access devices received at the first access device.

19. The non-transitory computer-readable medium of claim 17, wherein determining the RF continuity space based on the received data associated with the neighbor access devices comprises using k-means clustering on the data associated with the neighbor access devices.

20. The non-transitory computer-readable medium of claim 17, further comprising:
forwarding the discovery request to the selected worker computing device;
receiving, in response to forwarding the discovery request to the selected worker computing device, a discovery response from the selected worker computing device; and
forwarding, in response to receiving the discovery response from the selected worker computing device, the discovery response to the first access device.

* * * * *